(12) United States Patent
Brigham et al.

(10) Patent No.: US 8,659,641 B2
(45) Date of Patent: Feb. 25, 2014

(54) STEREOSCOPIC 3D LIQUID CRYSTAL DISPLAY APPARATUS WITH BLACK DATA INSERTION

(75) Inventors: Scott E. Brigham, Maplewood, MN (US); John C. Schultz, Afton, MN (US); Billy L. Weaver, Eagan, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1483 days.

(21) Appl. No.: 11/750,393

(22) Filed: May 18, 2007

(65) Prior Publication Data

US 2008/0284801 A1 Nov. 20, 2008

(51) Int. Cl.
*H04N 15/00* (2006.01)
*H04N 13/02* (2006.01)

(52) U.S. Cl.
USPC .................................. 348/42; 348/46; 348/47

(58) Field of Classification Search
USPC ....................................... 348/42–60; 345/102
See application file for complete search history.

(56) References Cited

U.S. PATENT DOCUMENTS

| | | | | |
|---|---|---|---|---|
| 5,726,703 | A * | 3/1998 | Izawa et al. | 348/46 |
| 6,567,063 | B1 | 5/2003 | Okita | |
| 7,057,638 | B1 | 6/2006 | Yuuki et al. | |
| 7,119,775 | B2 | 10/2006 | Ozaki | |
| 7,277,079 | B2 * | 10/2007 | Kobayashi et al. | 345/102 |
| 7,530,721 | B2 | 5/2009 | Mi et al. | |
| 2001/0052891 | A1 | 12/2001 | Yoshihara | |
| 2004/0130884 | A1 | 7/2004 | Yoo | |
| 2004/0222945 | A1 | 11/2004 | Taira et al. | |
| 2005/0052750 | A1 | 3/2005 | King | |
| 2005/0083294 | A1 | 4/2005 | Kim | |
| 2005/0140634 | A1 * | 6/2005 | Takatori | 345/96 |
| 2005/0254702 | A1 | 11/2005 | Era | |
| 2005/0259323 | A1 | 11/2005 | Fukushima et al. | |
| 2005/0276071 | A1 * | 12/2005 | Sasagawa et al. | 362/607 |
| 2006/0012676 | A1 * | 1/2006 | Tomita | 348/51 |
| 2006/0050047 | A1 | 3/2006 | Jin | |

(Continued)

FOREIGN PATENT DOCUMENTS

| | | |
|---|---|---|
| JP | 09051552 A | 2/1997 |
| JP | 2003-259395 | 9/2003 |
| JP | 2004/112814 A | 4/2004 |
| JP | 2005-078824 | 3/2005 |

OTHER PUBLICATIONS

"Fast Response and High Contrast OCB Display Using LEP Backlight and Novel Driving Scheme", Tanaka et al., p. 643-646, Research & Development Ctr., Toshiba Matsushita Display Technology Co., Ltd., 2006.

(Continued)

*Primary Examiner* — Chikaodili E Anyikire
(74) *Attorney, Agent, or Firm* — Lance L. Vietzke

(57) ABSTRACT

A display apparatus includes an liquid crystal display panel having a frame response time of less than 5 milliseconds, drive electronics configured to drive the liquid crystal display panel to black between images that are provided to the liquid crystal display panel at a rate of at least 90 images per second, and a backlight positioned to provide light to the liquid crystal display panel. The backlight includes a right eye solid state light source and a left eye solid state light source capable of being modulated between the right eye solid state light source and a left eye solid state light source at a rate of at least 90 Hertz.

16 Claims, 3 Drawing Sheets

(56) References Cited

U.S. PATENT DOCUMENTS

| | | | |
|---|---|---|---|
| 2006/0145978 A1* | 7/2006 | Takatori et al. | 345/87 |
| 2007/0103425 A1* | 5/2007 | Tanaka et al. | 345/102 |
| 2007/0109811 A1 | 5/2007 | Krijn et al. | |
| 2008/0036853 A1* | 2/2008 | Shestak et al. | 348/51 |

OTHER PUBLICATIONS

Ishikawa et al. "New Design for a Highly Collimating Turning Film," Eastman Kodak Company, SID 06 Digest, p. 514-517, 2006.

* cited by examiner

STEREOSCOPIC 3D LIQUID CRYSTAL DISPLAY APPARATUS WITH BLACK DATA INSERTION

FIELD

The present disclosure relates to a backlit liquid crystal display apparatus and particularly to displaying stereo 3D images using liquid crystal display apparatus to reduce visual cross-talk between left eye and right eye images.

BACKGROUND

A stereoscopic 3D display usually presents an observer with images with parallax from individual right and left eye viewpoints. There are two methods of providing the two eyes of the observer with the parallax images in a time sequential manner. In one method, the observer utilizes a pair of shutter or 3D glasses which transmit or block light from the viewer's eyes in synchronization with alternating the left/right image display. Similarly, in another method, right eye and left eye viewpoints are alternatively displayed and presented to the respective eyes of the observer but without the use of 3D glasses. This second method is referred to as autostereoscopic and is sometimes desirable for stereo 3D viewing because separate glasses are not needed though there is limited permissible head motion.

A liquid crystal display (LCD) is a sample and hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

When operating a stereoscopic 3D display on an LCD panel, where left and right frames are written to the LCD sequentially, left/right crosstalk can occur as the new image is drawn on the LCD. Since the LCD is a sample and hold display device, lines of the old image will persist until the new data is written, and then after the new data is written there is a time (the LCD response time) before the old image data fades away and the new image data is fully present. Further, the transition or response time of the LCD panel is often dependent on the difference in the brightness or gray level of the two images such that a white to black (W-B) or black to white (B-W) transition can take much less time than a gray-to-gray (G-G) transition time. For any of these cases, if the left or right eye sees the image on the LCD before the left or right image respectively has fully stabilized and the left or right backlight is on, then crosstalk may occur and the stereoscopic 3D effect will be degraded

BRIEF SUMMARY

The present disclosure relates to a backlit liquid crystal display apparatus and particularly to a liquid crystal display apparatus that reduces visual cross-talk between left eye and right eye images.

In a first embodiment, a display apparatus includes an liquid crystal display panel having a frame response time of less than 5 milliseconds, drive electronics configured to drive the liquid crystal display panel to black between images that are provided to the liquid crystal display panel at a rate of at least 90 images per second, and a directional backlight positioned to provide light to the liquid crystal display panel. The backlight includes a right eye solid state light source and a left eye solid state light source capable of being modulated between the right eye solid state light source and a left eye solid state light source at a rate of at least 90 Hertz.

In another embodiment, a display apparatus includes a liquid crystal display panel having a frame response time of less than 5 milliseconds, drive electronics configured to drive the liquid crystal display panel to black between images that are provided to the liquid crystal display panel at a rate of at least 90 images per second. Each image is fully drawn using a faster than normal LCD panel pixel clock in less than 75% of an image display time. The apparatus further includes a backlight positioned to provide light to the liquid crystal display panel. The backlight may include a plurality of right eye solid state light sources and a plurality of left eye solid state light sources capable of being modulated between the right eye solid state light source and a left eye solid state light source at a rate of at least 90 Hertz. In this embodiment the liquid crystal display panel need not be driven to black between images if the image is fully drawn in less than 75% of an image display time. Driving the image to black and/or drawing the image in less than the display time enables the use of this display as either an autostereoscopic display solution or a conventional stereoscopic 3D display solution requiring shutter glasses but using an LCD panel. If shutter glasses were used the backlight light sources could be modulated as described above to reduce power consumption or with both left and right eye image light sources turning on and off together rather than on alternate frames again to reduce power consumption or the backlight could be left on to simplify its operation and instead the shutterglasses controlled such that both eyes are off during the time the backlight would have been off as described above.

In a further embodiment, a display apparatus includes an liquid crystal display panel having a frame response time of less than 5 milliseconds, drive electronics configured to drive the liquid crystal display panel to black between images that are provided to the liquid crystal display panel at a rate of at least 90 images per second, and a segmented scanning backlight positioned to provide light to the liquid crystal display panel. The segmented scanning backlight includes a plurality of segments extending between first and second ends of the backlight and each segment has a segment height and a right eye solid state light source and a left eye solid state light source capable of being modulated between the right eye solid state light source and a left eye solid state light source at a rate of at least 90 Hertz. Each segment right eye solid state light source and each segment left eye solid state light source are configured to be turned on and off in a particular pattern.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
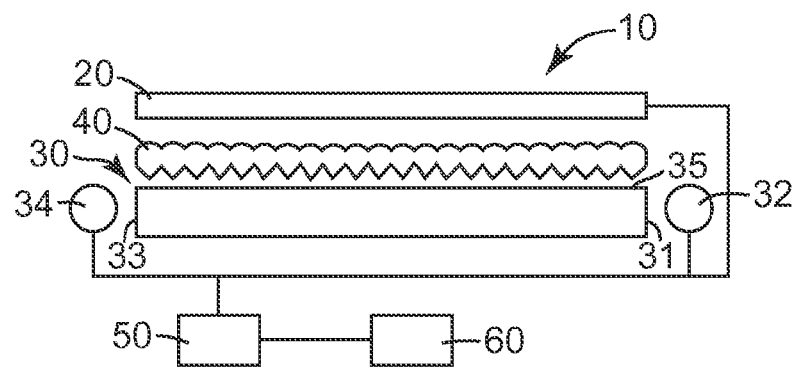
FIG. 1 is a schematic side view of an illustrative display apparatus.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of special headgear or glasses on the part of the user or viewer. These methods produce depth perception in the viewer even though the image is produced by a flat device. The term stereoscopic 3D incorporates the field of autostereoscopic devices but also includes the stereoscopic 3D display case in which special headgear, typically shutter glasses, are need to see stereoscopic 3D from a flat device.

The present disclosure relates to a backlit liquid crystal display apparatus and particularly to a liquid crystal display apparatus that reduces visual cross-talk between left eye and right eye images. The liquid crystal display has a frame response time of less than 5 milliseconds and drive electronics configured to drive the autostereoscopic liquid crystal display to black between right eye and left eye images. In some embodiments, the liquid crystal display drive electronics can increase the rate at which image pixel lines are addressed such that the entire image is drawn within 75% or less of the image cycle time. In some embodiments, the backlight is a segmented scanning backlight where black data is displayed within one backlight segment between image frames. One or more of these embodiments may be combined in a single display capable of providing a 3D visualization capability from a flat display either in a shutter glasses stereoscopic 3D display mode or in an autostereoscopic display mode. While the present invention is not so limited, an appreciation of various aspects of the invention will be gained through a discussion of the examples provided below.

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for a 3D display, during sequential refresh periods of the display requires careful sequencing of the backlight light sources so that, for example, the left eye light source is not on during the display of data for the right eye and vice versa.

FIG. 1 is a schematic side view of an illustrative display apparatus 10. The display apparatus includes a liquid crystal display panel 20 having a frame response time of less than 10 milliseconds, or less than 5 milliseconds, or less than 3 milliseconds, and a backlight 30 positioned to provide light to the liquid crystal display panel 20. The backlight 30 includes a right eye image solid state light source 32 and a left eye image solid state light source 34 capable of being modulated between the right eye image solid state light source 32 and the left eye image solid state light source 34 at a rate of at least 90 Hertz. A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While the present disclosure is directed to any stereoscopic 3D backlight including those requiring shutterglasses or more than a single lightguide and associated liquid crystal display panel, the present disclosure is particularly useful for autostereoscopic displays.

A synchronization driving element 50 is electrically connected to the backlight 30 light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any transmissive liquid crystal display panel that has a frame response time of less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of at least 90 Hertz, or 100 Hertz, or 110 Hertz, or 120 Hertz, or greater than 120 Hertz. The illustrated backlight 30 includes a first light input surface 31 adjacent to the right eye image solid state light source 32 and an opposing second light input surface 33 adjacent to the left eye image solid state light source 34 and a light output surface 35. The solid state light sources can be any useful solid state light source that can be modulated at a rate of at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as white, red, blue, and/or green. The backlight can be a single layer of optically clear material with light sources at both ends or two (or more) layers of optically clear material with a light source per layer which preferentially extract light in a desired direction for each layer.

The double sided prism film 40 can be any useful prism film having a lenticular structure on a first side and a prismatic structure on an opposing side. The double sided prism film 40 transmits light from the backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
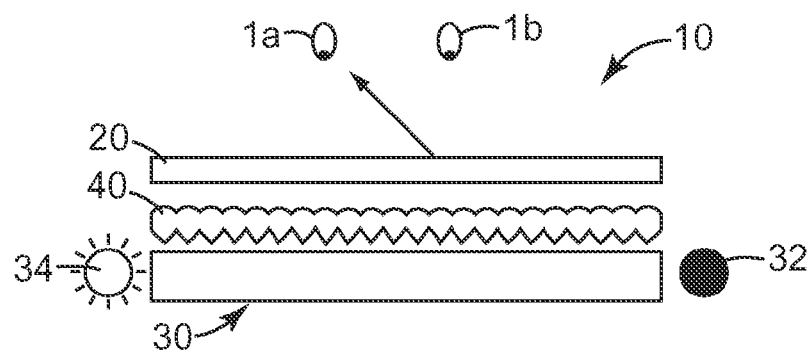
FIG. 2A and FIG. 2B are schematic side views of an illustrative display apparatus in operation.
Figure 2B:
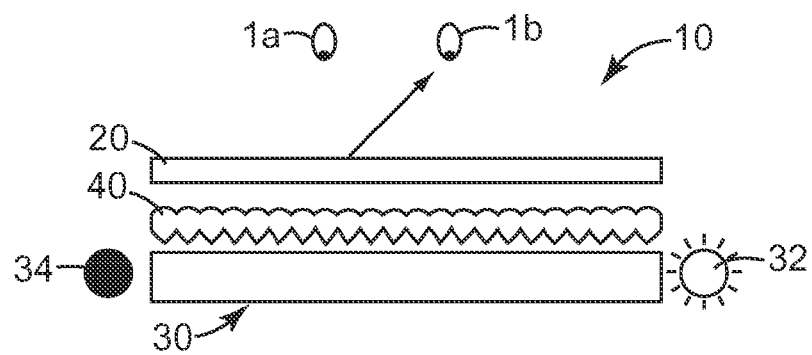

FIG. 2A and FIG. 2B are schematic side views of an illustrative display apparatus 10 in operation. In FIG. 2A the left eye image solid state light source 34 is illuminated and the right eye image solid state light source 32 is not illuminated. In this state, the light emitted from the left eye image solid state light source 34 transmits through the backlight 30, through the double sided prism sheet 40, and liquid crystal panel 20 providing a left eye image directed toward the left eye 1a of a viewer or observer. In FIG. 2B the right eye image solid state light source 32 is illuminated and the left eye image solid state light source 34 is not illuminated. In this state, the light emitted from the right eye solid state light source 32 transmits through the backlight 30, through the double sided prism sheet 40, and liquid crystal panel 20 providing a right eye image directed toward the right eye 1b of an viewer or observer.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized, otherwise cross-talk and a poor stereoscopic image will be perceived.

This disclosure describes black data insertion between image frames as a method of overcoming this limitation. This black data insertion generally erases the prior image before the new image is drawn on the display line. Thus, black data insertion assists in reducing visual cross-talk thereby improving the stereo image visualization and 3D viewing experience for an observer.

Figure 3:
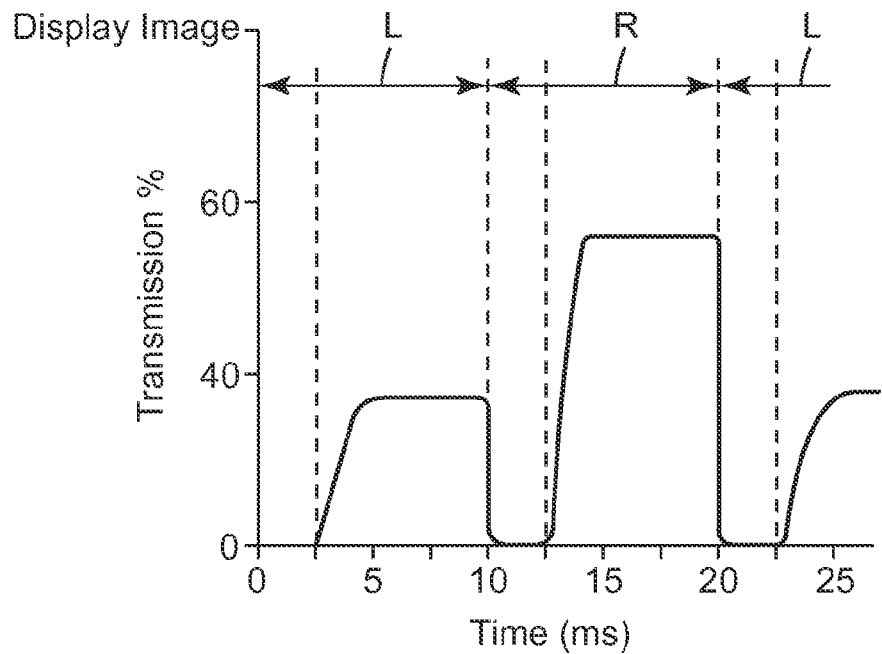
FIG. 3 is a Transmission % diagram illustrating black data insertion.

FIG. 3 is a Transmission % diagram illustrating black data insertion. A left image is displayed at a 40% transmission level and a right image is displayed at a 60% transmission level. These transmission levels are arbitrary and used herein for illustration purposes. The LCD panel drive electronics are configured to drive the liquid crystal display panel to black (i.e., around 0% transmission) between any images R, L, R, L, ... for a useful amount of time. In many embodiments, the drive electronics drive the liquid crystal display panel to black between images for a time in a range from 5% to 30% of the normal image display time, or a time in a range from 10% to 30% of the normal image display time, or for a time in a range from 18% to 24% of the normal image display time. Thus, at a frame cycle time of 10 milliseconds, from 0.5 to 3 milliseconds, or from 1.0 to 3 milliseconds, or from 1.8 milliseconds to 2.4 milliseconds of the image display time is black. This black data insertion erases the prior image before the new image is drawn on the display line.

This black data insertion assists in reducing visual cross-talk thereby improving the stereo image visualization and 3D viewing experience for an observer by improving the response time of the liquid crystal display panel, particularly for G-G transitions and ensuring that all previous image data is removed from the display regardless of gray levels of the previous image.

When the drive electronics force or drive the liquid crystal display panel to black with black data insertion, the right eye solid state light source and the left eye solid state light source can both, either or neither be lit, as desired. In some embodiments, both the right eye solid state light source and the left eye solid state light source are not lit when the drive electronics force or drive the liquid crystal display panel to black with black data insertion. In some embodiments, both the right eye solid state light source and the left eye solid state light source are lit when the drive electronics drive the liquid crystal display panel to black with black data insertion. In some embodiments, either the right eye solid state light source or the left eye solid state light source is lit when the drive electronics drive the liquid crystal display panel to black with black data insertion.

Figure 4:
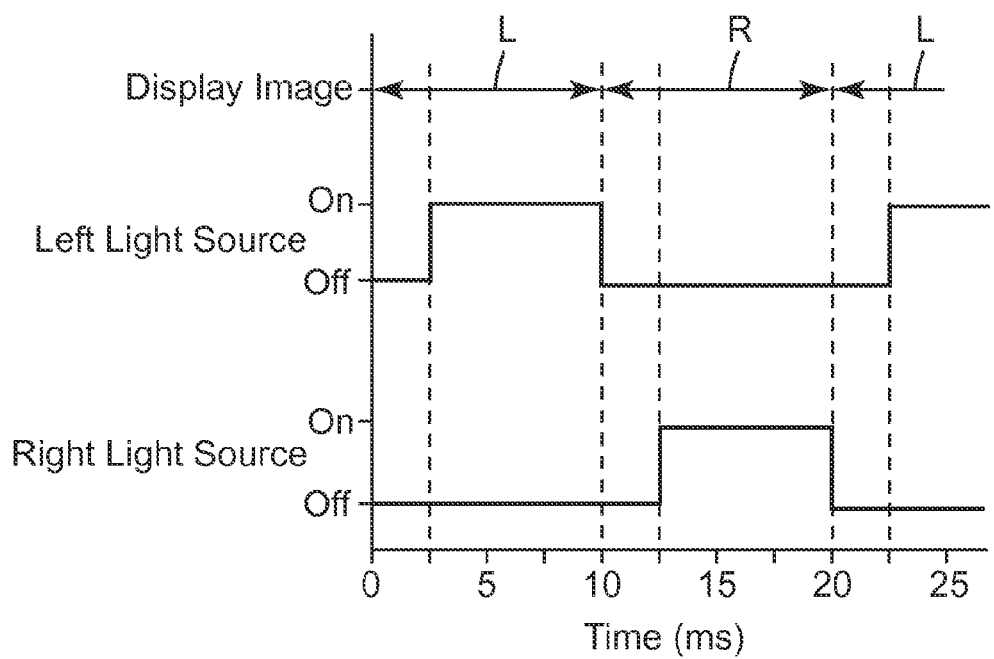
FIG. 4 is a timing diagram illustrating the activation of right and left light sources in relation to the display image.

FIG. 4 is an exemplary timing diagram illustrating the activation of right and left light sources in relation to the displayed image sequence: R, L. As illustrated, about 2.5 millisecond of each frame cycle time of 10 milliseconds has both right and left light sources unlit. This lighting scheme in combination with black data insertion and compressed image drawing time (discussed below) generally erases the prior image before the new image is drawn on the display line and keeps the display unlit until the prior image has disappeared and assists in reducing visual cross-talk thereby improving the stereo image visualization and 3D viewing experience for an observer.

Figure 5:
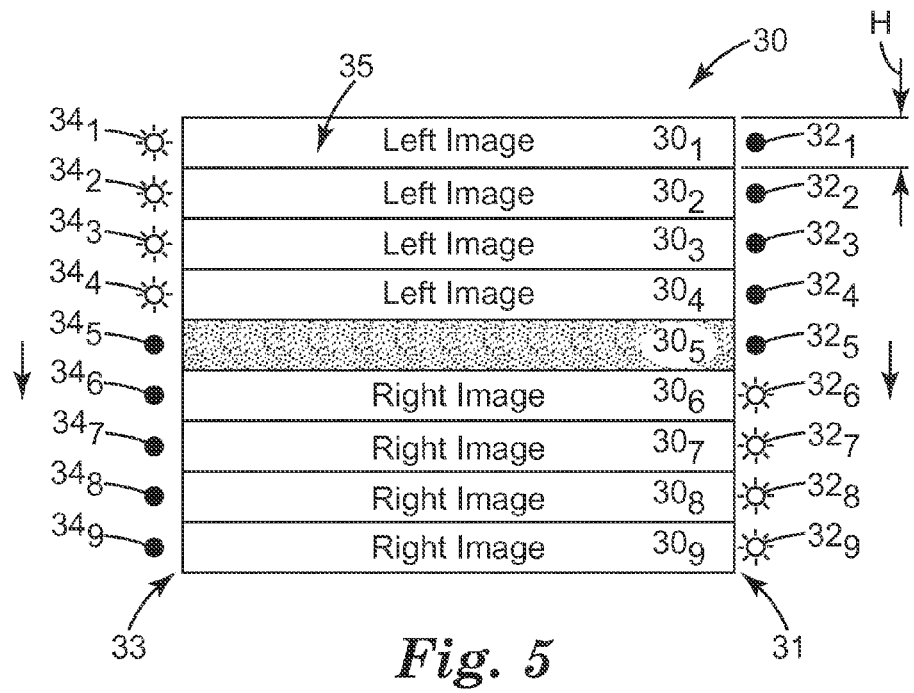
FIG. 5 is a schematic front view of an illustrative segmented scanning backlight.

FIG. 5 is a schematic front view of an illustrative segmented scanning backlight 30. A segmented scanning backlight 30 can be utilized with the black data insertion technique described above. A segmented scanning backlight 30 is positioned to provide light to the liquid crystal display panel, as described above. The segmented scanning backlight 30 includes a plurality of segments $30_1$, $30_2$, $30_3$, $30_4$, $30_5$, $30_6$, $30_7$, $30_8$, $30_9$ extending between first and second ends 31, 33 of the backlight 30 and each segment $30_1$, $30_2$, $30_3$, $30_4$, $30_5$, $30_6$, $30_7$, $30_8$, $30_9$ has a segment height H and a right eye solid state light source $32_1$, $32_2$, $32_3$, $32_4$, $32_5$, $32_6$, $32_7$, $32_8$, $32_9$ and a left eye solid state light source $34_1$, $34_2$, $34_3$, $34_4$, $34_5$, $34_6$, $34_7$, $34_8$, $34_9$ capable of being modulated between the right eye solid state light source $32_1$, $32_2$, $32_3$, $32_4$, $32_5$, $32_6$, $32_7$, $32_8$, $32_9$ and a left eye solid state light source $34_1$, $34_2$, $34_3$, $34_4$, $34_5$, $34_6$, $34_7$, $34_8$, $34_9$ at a rate of at least 90 Hertz. Each segment $30_1$, $30_2$, $30_3$, $30_4$, $30_5$, $30_6$, $30_7$, $30_8$, $30_9$ right eye solid state light source $32_1$, $32_2$, $32_3$, $32_4$, $32_5$, $32_6$, $32_7$, $32_8$, $32_9$ and each segment left eye solid state light source $30_1$, $30_2$, $30_3$, $30_4$, $30_5$, $30_6$, $30_7$, $30_8$, $30_9$ are configured to be turned on and off in a particular pattern corresponding to the LCD panel display pattern. While the LCD display pattern would typically be sequential from the top of the display to the bottom of the display, other patterns such as using dual channel addressing to simultaneously address the top and middle of the LCD panel as well as other sequences are possible. While nine segments and corresponding right eye solid state light source and left eye solid state light source is illustrated, any useful number or segments and corresponding right eye solid state light source and left eye solid state light source can be utilized.

In the illustrated embodiment, a prior right image is displayed on four segments $30_6$, $30_7$, $30_8$, $30_9$ of the display 30 and a new left image is displayed on four segments $30_1$, $30_2$, $30_3$, $30_4$, with one segment $34_5$ displaying black data and essentially erasing the right image before the new left image is drawn on the adjacent segment $30_4$. In addition, the corresponding right eye solid state light source $32_5$ and left eye solid state light source $34_5$ can be not lit or unlit to improve the black data presentation. The downward arrows show the direction of the image erasing and writing. In many embodiments, the cycle time of each image is less than 15 milliseconds, or less than 11 milliseconds, or less than 10 milliseconds. In many embodiments, the drive electronics are configured to drive the liquid crystal display panel to black with displayed black data between images, and the displayed black data has an image height being greater than or equal to the height H of at least selected segments $30_1$, $30_2$, $30_3$, $30_4$, $30_5$, $30_6$, $30_7$, $30_8$, $30_9$.

Figure 6A:
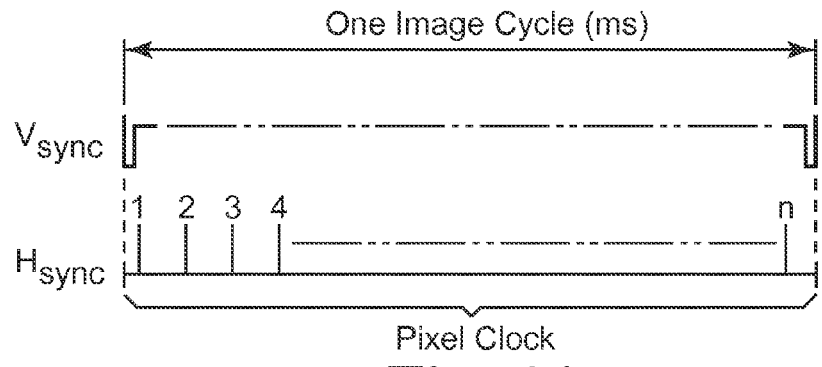
FIGS. 6A and 6B are timing diagrams illustrating compressed image drawing in relation to the displayed image cycle time.
Figure 6B:
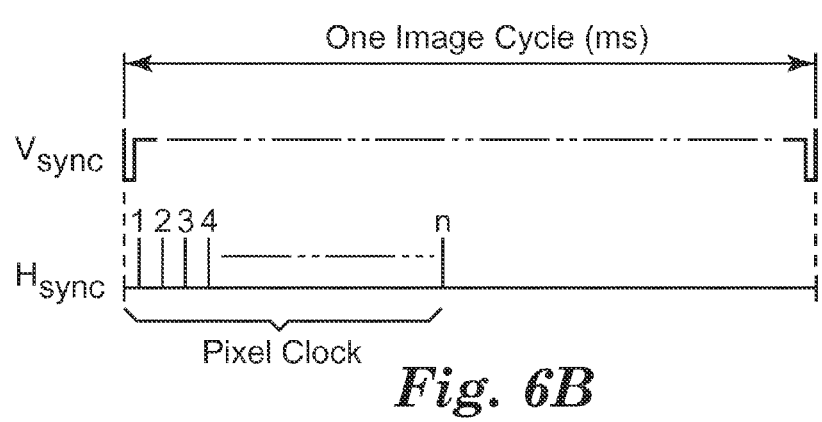

FIGS. 6A and 6B are timing diagrams illustrating compressed image refresh also called virtual segments in relation to the displayed image cycle time. This display drive configuration can be utilized with the black data insertion technique described above to further reduce visual cross-talk thereby improving the stereo image visualization and 3D viewing experience for an observer or this display drive configuration can be used without inserting black data. To implement virtual segments, the drive electronics are configured to increase the pixel clock such that each image is fully drawn in less than 75% of an image cycle time, or fully drawn in 60% of an image cycle time or less.

In a normal or uncompressed image display, as shown in FIG. 6A, for each image refresh, the image line periods, controlled by the horizontal sync $H_{sync}$ period refreshes each pixel line 1, 2, 3, 4, . . . n in about the time duration of one image cycle divided by the number of displayed lines plus a relatively small number of additional lines for synchronization, front porch and back porch timing. For example, an uncompressed image having 480 displayed lines may have 525 $H_{sync}$ total timing lines composed of 2 lines of synchronization, 18 lines of front porch time and 25 lines of back porch time in addition to the 480 lines of image and the entire 525 lines are fully drawn at about 10 milliseconds for a 100 Hz display. However FIG. 6B illustrates the compressed mode or virtual segment mode of operating the liquid crystal drive electronics at increased pixel clock speed. In the virtual segment mode of operation, the horizontal sync $H_{sync}$ period of the increased pixel clock refreshes each pixel line 1, 2, 3, 4, . . . n in 75% or 60% or less of the normal time required to refresh a single line. The faster image display time provides a virtual display segment at the end of the shorter time required to write or draw the image to the display since the input image rate is still, for example 10 ms and during the time between the end of the faster display update and the end of the incoming data, the backlight can be on, creating a brighter display. For example, a compressed or virtual segmented image having 480 pixel lines is fully drawn at about 7.5 or 6 milliseconds or less for a 100 Hz display with a faster pixel clock and during the additional 175 or 350 or more image lines, with a sufficiently fast liquid crystal display panel, the appropriate light source can be left on, significantly increasing the brightness of the display.

The concept of increasing the pixel clock to create a virtual segment and thereby increase the display brightness can be used with or without black data insertion. Further any or all of the techniques of black data insertion, faster pixel clocks to create virtual segments and/or a segmented scanning backlight can be used to enable stereoscopic 3D liquid crystal displays which work with shutter glasses.

Thus, embodiments of the STEREOSCOPIC 3D LIQUID CRYSTAL DISPLAY APPARATUS WITH BLACK DATA INSERTION are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:
1. A display apparatus, comprising:
 a liquid crystal display panel having a frame response time of less than 5 milliseconds;
 drive electronics configured to drive the liquid crystal display panel to black between a right eye image and a left eye image that are provided to the liquid crystal display panel at a rate of at least 90 images per second; and a segmented scanning backlight positioned to provide light to the liquid crystal display panel, the backlight comprising a right eye solid state light source and a left eye solid state light source capable of being modulated between the right eye solid state light source and the left eye solid state light source at a rate of at least 90 Hertz and configured to sequentially scan the right eye image and then the left eye image with black data separating the right eye image from the left eye image, wherein the entire right eye image is scanned from a top portion to a bottom portion of the segmented scanning backlight, and then the black data is scanned from the top portion to the bottom portion of the segmented scanning backlight, and then the entire left eye image is scanned from the top portion to the bottom portion of the segmented scanning backlight.

2. A display apparatus according to claim 1, further comprising a double sided prism film disposed between the liquid crystal display panel and the backlight.

3. A display apparatus according to claim 1, wherein the liquid crystal display panel has a frame response time of less than 3 milliseconds.

4. A display apparatus according to claim 1, wherein the segmented scanning backlight comprises a first light input end and an opposing second light input end and the right eye solid state light source is positioned to direct light into the first light input end and the left eye solid state light source is positioned to direct light into the second light input end.

5. A display apparatus according to claim 1, further comprising a synchronization driving element that synchronizes activation and deactivation of the right eye solid state light source and the left eye solid state light source with image frames provided at a rate of 90 frames per second or greater to the liquid crystal display panel to produce a flicker-free image stream.

6. A display apparatus according to claim 1, wherein the drive electronics drive the liquid crystal display panel to black between images for a time in a range from 5% to 30% of the time required to display the image.

7. A display apparatus according to claim 1, wherein the liquid crystal display panel is an optically compensated bend mode liquid crystal display panel.

8. A display apparatus according to claim 1, wherein the right eye solid state light source and the left eye solid state light source can both, either or neither be lit when the drive electronics force the liquid crystal display panel to black.

9. A display apparatus, comprising:
a liquid crystal display panel having a frame response time of less than 5 milliseconds;
drive electronics configured to drive images provided to the liquid crystal display panel at a rate of at least 90 images per second, and each image is fully drawn in less than 75% of an image cycle time;
a segmented scanning backlight positioned to provide light to the liquid crystal display panel, the backlight comprising a plurality of right eye solid state light sources and a plurality of left eye solid state light sources capable of being modulated between the right eye solid state light source and a left eye solid state light source at a rate of at least 90 Hertz and configured to sequentially scan an entire right eye image from a top portion to a bottom portion of the segmented scanning backlight, and then black data is scanned from the top portion to the bottom portion of the segmented scanning backlight, and then an entire left eye image is scanned from the top portion to the bottom portion of the segmented scanning backlight;
a double sided prism film disposed between the liquid crystal display panel and the segmented scanning backlight; and
a synchronization driving element that synchronizes activation and deactivation of the right eye solid state light source and the left eye solid state light source with image frames provided at a rate of 90 frames per second or greater to the liquid crystal display panel to produce a flicker-free image stream;
wherein the drive electronics drive the liquid crystal display panel to black with displayed black data between the right eye and left eye images for a time in a range from 1.8 milliseconds to 2.4 milliseconds and the right eye solid state light source and the left eye solid state light source are both unlit while the drive electronics drive the liquid crystal display panel to black.

10. A display apparatus according to claim 9, further comprising a backlight positioned to provide light to the liquid crystal display panel, the backlight comprising a plurality of solid state light sources that are constantly lit and further comprising shutter glasses capable of being synchronized with the images provided to the liquid crystal display panel at a rate of at least 90 images per second.

11. A display apparatus according to claim 9, wherein each image is fully drawn in less than 60% of an image cycle time.

12. A display apparatus, comprising:
a liquid crystal display panel having a frame response time of less than 5 milliseconds;
drive electronics configured to drive the liquid crystal display panel to black with displayed black data between images that are provided to the liquid crystal display panel at a rate of at least 90 images per second; and
a segmented scanning backlight positioned to provide light to the liquid crystal display panel, the segmented scanning backlight comprises a plurality of segments, wherein each segment extends between a first end and a second end of the backlight and each segment has a segment height, and a right eye solid state light source and a left eye solid state light source capable of being modulated between the right eye solid state light source and a left eye solid state light source at a rate of at least 90 Hertz, each segment right eye solid state light source and each segment left eye solid state light source are configured to be turned on and off in a particular pattern and configured to sequentially scan a right eye image and then a left eye image with a segment of black data separating the right eye image from the left eye image, wherein, the entire right eye image is scanned from a top portion to a bottom portion of the segmented scanning backlight, and then the black data is scanned from the top portion to the bottom portion of the segmented scanning backlight, and then the entire left eye image is scanned from the top portion to the bottom portion of the segmented scanning backlight.

13. A display apparatus according to claim 12, further comprising a double sided prism film disposed between the liquid crystal display panel and the segmented scanning backlight.

14. A display apparatus according to claim 12, wherein the liquid crystal display panel has a frame response time of less than 3 milliseconds.

15. A display apparatus according to claim 12, further comprising a synchronization driving element that synchronizes independent activation and deactivation of each right eye solid state light source and each left eye solid state light source with image frames provided at a rate of 90 frames per second or greater to the liquid crystal display panel to produce a flicker-free image stream.

16. A display apparatus according to claim 12, wherein the drive electronics are configured to drive the liquid crystal display panel to black with displayed black data between images, and the displayed black data has an image height being greater than or equal to a height of at least selected segments.

* * * * *